Nov. 20, 1928.   A. M. TROGNER   1,692,064
RADIO RECEIVING APPARATUS
Filed Feb. 5, 1927   2 Sheets-Sheet 2
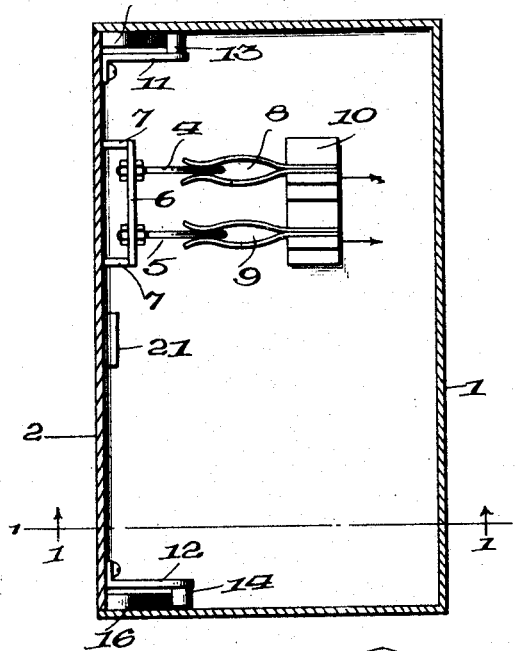
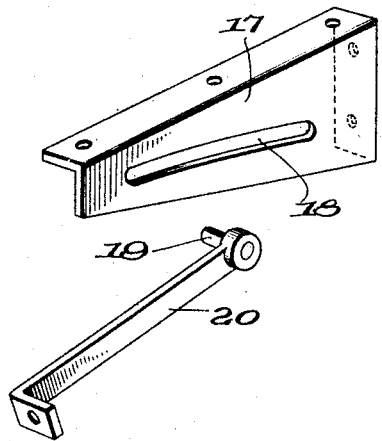
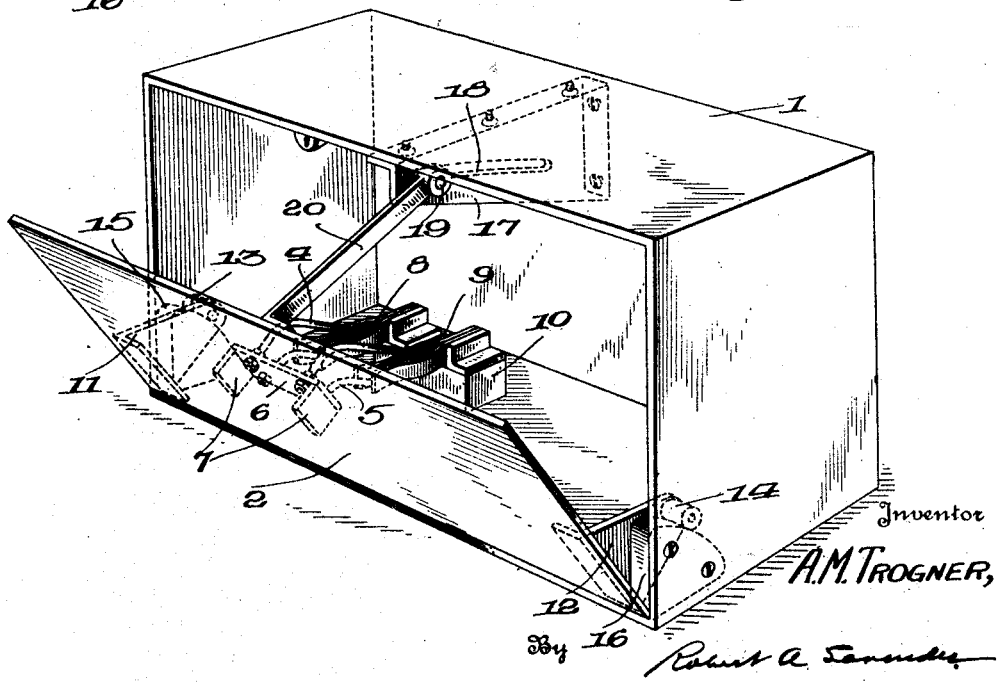
Inventor
A. M. TROGNER,
By Robert A. Saunders
Attorney Patented Nov. 20, 1928.

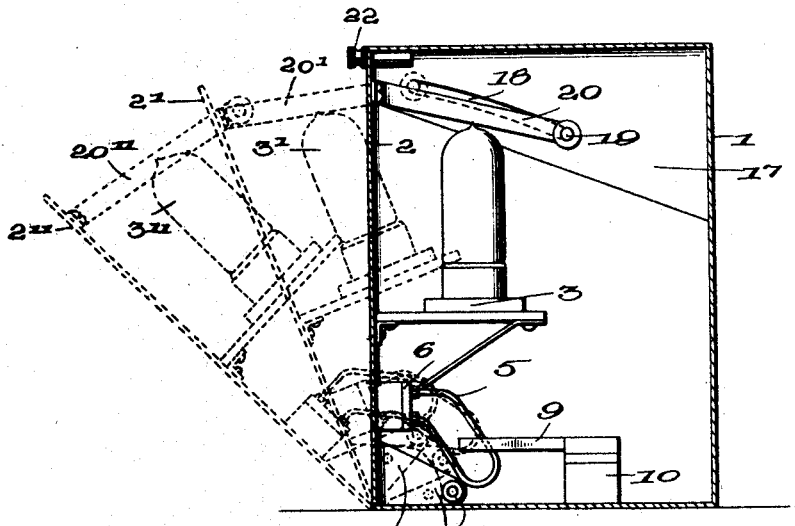
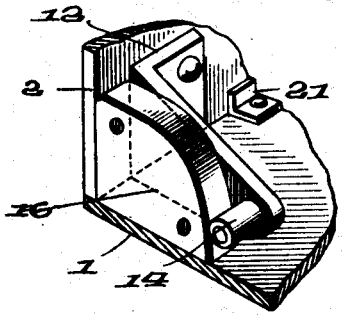
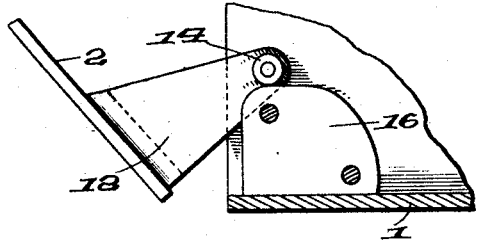
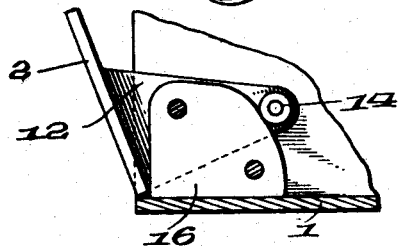
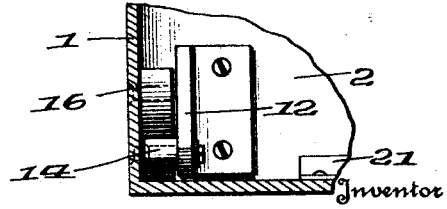

1,692,064

UNITED STATES PATENT OFFICE.

ARTHUR M. TROGNER, OF TAKOMA PARK, MARYLAND, ASSIGNOR TO WIRED RADIO, INC., OF NEW YORK, N. Y., A CORPORATION OF DELAWARE.

RADIO RECEIVING APPARATUS.

Application filed February 5, 1927. Serial No. 166,110.

My invention relates broadly to electrical apparatus and more particularly to a construction of instrument panel and arrangement of connections to the various parts of the electrical apparatus.

One of the objects of my invention is to provide a construction of instrument panel and cabinet for enclosing electrical apparatus wherein the instrument panel may be removed with respect to the cabinet for permitting the inspection of the electrical apparatus within the cabinet and the repair of the equipment while the electrical circuits remain in condition to be fully energized.

Another object of my invention is to provide a construction of instrument panel for carrying electrical apparatus thereon which may be normally housed within a cabinet structure, the panel with equipment thereon being arranged to permit access to be had to the various circuits in the equipment while the circuits are fully energized from power supply apparatus or batteries which may be contained within the cabinet.

Still another object of my invention is to provide a construction of instrument panel for carrying electrical apparatus where the panel forms a side closure for a cabinet housing, the panel being arranged to be wholly removed from the cabinet structure or partially removed therefrom while connections are maintained with other parts of the electrical equipment which may be situated within the cabinet housing in order that access may be readily had to the equipment carried by the panel while the apparatus is fully energized by circuit connections with the electrical equipment within the cabinet structure.

My invention will be more clearly understood from the specification hereinafter following by reference to the accompanying drawings wherein:

Figure 1 is a cross-sectional view taken through the cabinet structure and panel equipment of my invention where the panel is shown in full line position as fully closing the cabinet structure for normal operation of the apparatus and in dotted line positions for illustrating the several positions which the panel structure may assume when access is being obtained to the equipment thereon for the purpose of repair; Fig. 2 is a fragmentary perspective view showing one of the cam structures which I provide for guiding the panel into position with respect to the cabinet housing; Fig. 3 is a side elevation of the cam structure showing the instrument panel about to be removed from the front of the cabinet structure; Fig. 4 is a view of the panel structure and cam arrangement where the panel is about to be removed from the cabinet housing; Fig. 5 is a fragmentary elevational view showing one of the cam structures which forms a guide for the apparatus panel; Fig. 6 is a partial plan view of the cabinet housing the panel structure, illustrating the electrical contacts which establish connection between the apparatus on the instrument panel and the equipment within the cabinet housing; Fig. 7 is a perspective view of the bracket member and link which I provide midway of the cabinet housing for guiding the instrument panel into position and supporting the instrument panel at an angle with respect to the cabinet housing for permitting access to the electrical apparatus carried by the panel structure while the equipment thereon is connected with the circuit arrangement within the cabinet housing; Fig. 8 is a perspective view of the link member which extends between the bracket within the cabinet housing and the instrument panel.

I have illustrated my invention as applied to radio receiving apparatus where electron tubes and associated equipment are mounted upon the rear of a normally vertical panel structure which forms the front closure of a cabinet housing by which the electron tube equipment is normally protected. For the purpose of inspection and repair of the electron tube apparatus, it is desirable to remove the equipment at such distance from the cabinet structure as will permit access to the apparatus at the same time that connections are still maintained with the power supply or battery equipment within the cabinet structure. The receiving apparatus construction of my invention permits this result to be accomplished by the provision of cam guide members at opposite ends of the panel structure with connections protruding from the rear of the instrument panel and slidable between spring jaws for a distance proportional to the distance to which the instrument panel is removed from the cabinet housing so that circuit connections with the equipment within the cabinet are not broken when the instrument panel is swung at a substantial angle beyond the limits of the cabinet housing. The cam guides are so arranged that the instrument panel may thereafter be readily removed from the cabinet housing and repairs to the apparatus made. By returning the instrument panel to a position in proximity to the cabinet housing with the connectors protruding from the instrument panel contacting with the connectors within the cabinet housing observation may be made with respect to the repairs thus effected and the repairs finally completed and the instrument panel returned to normal position closing the front of the cabinet structure.

Referring to the drawings in detail, reference character 1 designates the cabinet housing comprising end walls and three side walls with an open side in the front thereof which may be closed by the instrument panel 2 arranged to carry electron tube equipment 3 at the rear thereof. The electron tube equipment 3 may have transformer circuits associated therewith and other instrumentalities forming the tuning equipment for radio receiving apparatus. Protruding at right angles to the rear of the instrument panel 2 I provide a plurality of contact members represented for the purpose of illustrating my invention at 4 and 5. These contact members are in the shape of angularly disposed elongated U-shaped connectors which extend horizontally for a part of the distance interiorly of the cabinet and then depend downwardly at an angle in the direction of the base of the cabinet housing. The contact members are mounted upon an insulated sub-panel member 6 supported by means of bracket 7 in spaced relationship to the metallic panel 2. It is understood that there may be an extended row of these contact members for providing circuit connections between the cathode and anode circuits with batteries or other power equipment within the cabinet housing. The connection with the power equipment or batteries within the cabinet housing is completed through a row of spring jaw contacts represented at 8 and 9 independently supported on an insulated strip 10 which may extend within the cabinet housing parallel to the strip 6 on the instrument panel. At each end of the instrument panel I provide bracket members 11 and 12 which are tapered at one end and provided with rollers 13 and 14 journaled thereon. These rollers will engage the curved surfaces of cam members 15 and 16 secured in corners of the cabinet housing adjacent the front wall thereof by suitable means extending through the end walls of the cabinet structure. The instrument panel is arranged to rock around the lower edge thereof as a fulcrum from a position where the plane of the instrument panel 2 is normally flush with the edges of the side walls of the cabinet housing 1 to a position where the instrument panel is disposed at an angle with respect to the cabinet housing and where access may be readily had to the apparatus on the rear of the instrument panel. Figures 1 and 8 illustrate the path of motion which is possible for the instrument panel with respect to the cabinet housing and throughout this movement the contact members 4 and 5 are in engagement with the spring jaws 8 and 9 so that the electron tubes when the panel 2 is in dotted line position 2′ or 2″ will assume a position 3′ or 3″ as illustrated in Figure 1 where they are readily accessible for inspection or repair, the circuits being uninterrupted in order to guide the instrument panel 2 in desired angular positions 2′ and 2″. I provide a bracket member 17 which is mounted midway of the cabinet housing 1 and provided with a guide slot 18 through which a removable pin member 19 in link 20 is arranged to slide. The link 20 is secured to the rear of the panel 2 at a point adjacent the top thereof and steadies the panel 2 in position 20′ as the panel 2 is moved outwardly at an angle with respect to the cabinet housing. When it is desired to entirely remove the panel from the cabinet housing the removable pin 19 is withdrawn from the slot 18 and the panel swung out as represented in successive steps in Fig. 4 and Fig. 3 to a position 2″ where it may be wholly withdrawn in a horizontal direction from the cabinet structure. As an additional stiffening means for the panel an angle member illustrated at 21 in Figures 2 and 6 may be provided attached to the bottom of the cabinet forming a stop for the lower edge of the panel 2. A thumb screw 22 may be provided as represented in Fig. 1 for locking the panel in its normal position when the apparatus is wholly within the cabinet housing. Apparatus constructed in accordance with the disclosure of my invention herein has been found to be very practical in operation.

While I have illustrated one of the preferred embodiments of my invention I desire that it be understood that modifications may be made and that no limitations upon my invention are intended other than are imposed by the scope of the appended claims.

What I claim as new and desire to secure by Letters Patent of the United States is as follows:

1. A radio receiving apparatus comprising a cabinet structure, a plurality of contacts mounted adjacent the base of said cabinet structure providing circuit terminals within said cabinet structure, a removable panel member for normally closing said cabinet structure carrying radio receiving apparatus thereon, said removable panel member having an insulated sub-panel thereon with connecting members projecting from said insulated sub-panel, said connecting members projecting horizontally into said cabinet structure and depending at an angle with respect to said sub-panel for engaging said contacts within said cabinet structure for establishing continuous slidable connection with said contacts within said cabinet structure while said panel member is being removed a substantial distance from said cabinet structure for permitting access to radio equipment carried by said panel while said connection is maintained between said connecting members and said contacts.

2. Radio receiving apparatus comprising a cabinet structure, a plurality of circuit terminals mounted upon the base of said cabinet structure, a panel member carrying radio apparatus and normally arranged to close said cabinet structure, an insulated sub-panel carried by said panel member and having contact members mounted thereon and extending into said cabinet structure for establishing sliding connection with the circuit terminals within said cabinet structure, a pair of guides mounted in said cabinet structure adjacent opposite ends thereof and a cooperating set of guides mounted upon the rear of said panel member for engaging said first mentioned pair of guides for facilitating the removal and replacement of said panel member with respect to said cabinet structure while the contact members on said sub-panel are maintained in connection with the circuit terminals within said cabinet structure when said panel member is removed from said cabinet structure for a distance permitting access to the rear of said panel member.

3. Radio receiving apparatus comprising a cabinet structure, a removable panel member for normally closing one side of said cabinet structure, a pair of cam shaped guides located adjacent opposite ends of said cabinet structure, a pair of guides mounted upon the rear of said panel member and arranged to cooperate with the guides in said cabinet structure, circuit terminals, mounted interiorly of the base of said cabinet structure, connecting members insulatingly supported on the rear of said panel member and connected to apparatus supported by said panel member, said connecting members slidably engaging the circuit terminals within said cabinet structure, and detachable means for limiting the angular movement of said panel member with respect to said cabinet structure, while circuit connections are maintained between said connecting members on said panel and the circuit terminals in said cabinet structure, when said panel member is angularly disposed with respect to said cabinet structure for permitting access to apparatus carried by said panel member.

4. Radio apparatus comprising a cabinet structure having circuit terminals mounted interiorly thereof, a panel member arranged to normally close one side of said cabinet structure, said panel member having a pair of inwardly projecting bracket members at opposite ends thereof, rollers carried by each of said bracket members, a pair of cam members mounted within said cabinet structure at opposite ends and having faces thereon arranged to cooperate with said rollers, connecting members insulatingly supported on the rear of said panel member and extending into said cabinet structure for slidably engaging said circuit terminals for establishing connection between apparatus carried by said panel member and apparatus within said cabinet structure, means for limiting the angular displacement of said panel member with respect to said cabinet structure, said means being detachable for the subsequent removal of said panel member from said cabinet structure, said connecting members being maintained in electrical connection with said circuit terminals while said panel member is removed a substantial distance from said cabinet structure.

5. Radio apparatus comprising a cabinet structure, a pair of cam members mounted at opposite ends of said cabinet structure, a panel member having inwardly extending brackets thereon, rollers pivotally mounted on said brackets and arranged to engage the faces of said cam members for guiding said panel member into a position closing the front of said cabinet structure and permitting removal of said panel member from said cabinet structure, a plurality of circuit terminals carried by the rear of said panel members and a plurality of contact members carried by the base of said cabinet structure, the circuit terminals on said panel member projecting into said cabinet structure and slidably engaging the contact terminals therein for maintaining connection between the contact terminals within said cabinet structure and the circuit terminals on said panel member when said panel member is moved at an angle with respect to said cabinet structure for permitting access to the rear of the panel member while apparatus carried thereby is in operating condition.

ARTHUR M. TROGNER.